United States Patent
Farrell et al.

(10) Patent No.: US 10,486,689 B2
(45) Date of Patent: Nov. 26, 2019

(54) SYSTEMS AND METHODS FOR REDUCING EXTERIOR NOISE DURING ELECTRIFIED VEHICLE OPERATION

(71) Applicant: FORD GLOBAL TECHNOLOGIES, LLC, Dearborn, MI (US)

(72) Inventors: David Farrell, Dearborn, MI (US); Mark Steven Yamazaki, Canton, MI (US); Ming Cheng, Farmington Hills, MI (US); Tony Tae-Jin Pak, Garden City, MI (US); Nagarjuna Muvva, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 47 days.

(21) Appl. No.: 15/895,021

(22) Filed: Feb. 13, 2018

(65) Prior Publication Data
US 2019/0248361 A1    Aug. 15, 2019

(51) Int. Cl.
| B60W 20/17 | (2016.01) |
| B60W 10/06 | (2006.01) |
| B60W 10/30 | (2006.01) |
| B60W 20/50 | (2016.01) |

(52) U.S. Cl.
CPC ............ *B60W 20/17* (2016.01); *B60W 10/06* (2013.01); *B60W 10/30* (2013.01); *B60W 20/50* (2013.01); *B60W 2530/14* (2013.01); *B60W 2550/12* (2013.01); *B60W 2710/065* (2013.01); *B60W 2710/0644* (2013.01); *B60W 2710/0666* (2013.01); *Y10S 903/93* (2013.01)

(58) Field of Classification Search
CPC ...... B60W 20/17; B60W 10/06; B60W 20/50; B60W 10/30; B60W 2710/065; B60W 2530/14; B60W 2710/0644; B60W 2550/12; B60W 2710/0666; Y10S 903/93
See application file for complete search history.

(56) References Cited

U.S. PATENT DOCUMENTS

| 6,724,166 | B2 * | 4/2004 | Narumi | G05B 5/01 |
| | | | | 318/400.04 |
| 7,222,004 | B2 | 5/2007 | Anderson | |
| 7,357,220 | B2 * | 4/2008 | Horikou | F02M 35/1222 |
| | | | | 123/184.59 |
| 7,923,961 | B2 * | 4/2011 | Takamatsu | B60L 15/2045 |
| | | | | 318/811 |
| 8,384,528 | B2 | 2/2013 | McCarthy et al. | |
| 9,479,095 | B2 | 10/2016 | Sankaran | |
| 9,646,596 | B2 | 5/2017 | Tani et al. | |
| 9,656,552 | B2 | 5/2017 | Kautz | |
| 9,758,055 | B2 * | 9/2017 | Izumi | B60L 11/1874 |
| 10,224,017 | B2 * | 3/2019 | Lee | H04R 3/04 |

(Continued)

FOREIGN PATENT DOCUMENTS

JP    2006311769 A    11/2006
WO    2017/157669 A1    9/2017

*Primary Examiner* — Tyler J Lee
(74) *Attorney, Agent, or Firm* — David Kelley; Carlson, Gaskey & Olds

(57) ABSTRACT

A method includes automatically operating an electrified vehicle in a noise reduction mode, via a control system of the electrified vehicle, if, based at least on noise restriction information and driver history information received by the control system, a current time and a current location of the electrified vehicle are appropriate for invoking the noise reduction mode.

19 Claims, 4 Drawing Sheets

(56) References Cited

U.S. PATENT DOCUMENTS

| | | |
|---|---|---|
| 2010/0145562 A1 | 6/2010 | Moran |
| 2011/0015813 A1* | 1/2011 | Munukur .............. B60W 20/15 |
| | | 701/22 |
| 2015/0256668 A1* | 9/2015 | Atkinson ............ H04M 1/6075 |
| | | 455/418 |
| 2016/0185250 A1* | 6/2016 | Izumi .................. B60L 11/1874 |
| | | 701/22 |

* cited by examiner

SYSTEMS AND METHODS FOR REDUCING EXTERIOR NOISE DURING ELECTRIFIED VEHICLE OPERATION

TECHNICAL FIELD

This disclosure relates to electrified vehicles, and more particularly to systems and methods for reducing exterior noise during operation of electrified vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

Some electrified vehicles, such as hybrid electric vehicles (HEV's), are equipped with an engine and an electric machine that are both capable of supplying torque for powering the vehicle drive wheels. A significant amount of vehicle exterior noise is created during normal engine operation, engine start/stop, and engine idling. This noise is often the result of mechanical motion of components, fuel combustion, air intake, and exhaust processes of the engine. In some situations, this noise may be undesirable to the vehicle operator and nearby pedestrians.

SUMMARY

A method according to an exemplary aspect of the present disclosure includes, among other things, automatically operating an electrified vehicle in a noise reduction mode, via a control system of the electrified vehicle, if, based at least on noise restriction information and driver history information received by the control system, a current time and a current location of the electrified vehicle are appropriate for invoking the noise reduction mode.

In a further non-limiting embodiment of the foregoing method, automatically operating the electrified vehicle in the noise reduction mode includes reducing or muting a speaker volume of an infotainment control system.

In a further non-limiting embodiment of either of the foregoing methods, automatically operating the electrified vehicle in the noise reduction mode includes modifying a speed target and a torque target of an engine of the electrified vehicle.

In a further non-limiting embodiment of any of the foregoing methods, automatically operating the electrified vehicle in the noise reduction mode includes modifying an idle speed and a torque target of an engine of the electrified vehicle.

In a further non-limiting embodiment of any of the foregoing methods, automatically operating the electrified vehicle in the noise reduction mode includes inactivating at least one cylinder of an engine of the electrified vehicle.

In a further non-limiting embodiment of any of the foregoing methods, automatically operating the electrified vehicle in the noise reduction mode includes requesting an electric operating mode in which starting of an engine of the electrified vehicle is restricted during the noise reduction mode.

In a further non-limiting embodiment of any of the foregoing methods, automatically operating the electrified vehicle in the noise reduction mode includes modifying an operating mode of an exhaust bypass valve.

In a further non-limiting embodiment of any of the foregoing methods, the method includes obtaining the noise restriction information from a noise restriction database.

In a further non-limiting embodiment of any of the foregoing methods, the noise restriction information includes acceptable noise levels associated with the current time and the current location, and local noise ordinance information.

In a further non-limiting embodiment of any of the foregoing methods, the method includes obtaining the driver history information form a driver history database.

In a further non-limiting embodiment of any of the foregoing methods, the driver history information includes locations where the electrified vehicle has previously traveled, vehicle modes that were utilized at each of the locations where the electrified vehicle has previously travelled, and driver settings that were utilized at each of the locations where the electrified vehicle has previously travelled.

In a further non-limiting embodiment of any of the foregoing methods, automatically operating the electrified vehicle in the noise reduction mode is further based on environmental information.

In a further non-limiting embodiment of any of the foregoing methods, the environmental information includes ambient temperatures and a presence of nearby pedestrians or objects.

In a further non-limiting embodiment of any of the foregoing methods, automatically operating the electrified vehicle in the noise reduction mode is further based on vehicle status information.

In a further non-limiting embodiment of any of the foregoing methods, the vehicle status information includes vehicle health information and vehicle fault information.

An electrified vehicle according to another exemplary aspect of the present disclosure includes, among other things, a drive wheel, an engine, and an electric machine. Both the engine and the electric machine are adapted to selectively supply torque for powering the drive wheel. A smart noise reduction control system is configured to control the electrified vehicle in a noise reduction mode based at least on a current time, a current location, noise restriction information, and driver history information.

In a further non-limiting embodiment of the foregoing electrified vehicle, the smart noise reduction control system includes an input fusion block, an activation/deactivation block, a noise restriction database, and a status and faults monitoring block.

In a further non-limiting embodiment of either of the foregoing vehicle systems, the smart noise reduction control system is configured to command an infotainment control system to reduce or mute a speaker volume in response to invoking the noise reduction mode.

In a further non-limiting embodiment of any of the foregoing vehicle systems, the smart noise reduction control system is configured to command a modification of an operating behavior of the engine in response to invoking the noise reduction mode.

In a further non-limiting embodiment of any of the foregoing vehicle systems, the smart noise reduction control system is configured to command a modification of an operating behavior of an exhaust component of the electrified vehicle in response to invoking the noise reduction mode.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for reducing vehicle exterior noise during operation of an electrified vehicle. An exemplary noise reduction method includes automatically operating an electrified vehicle in a noise reduction mode if, based at least on noise restriction information and driver history information received by a control system, a current time and a current location of the electrified vehicle are appropriate for invoking the noise reduction mode. These and other features are discussed in greater detail in the following paragraphs of this detailed description.

Figure 1:
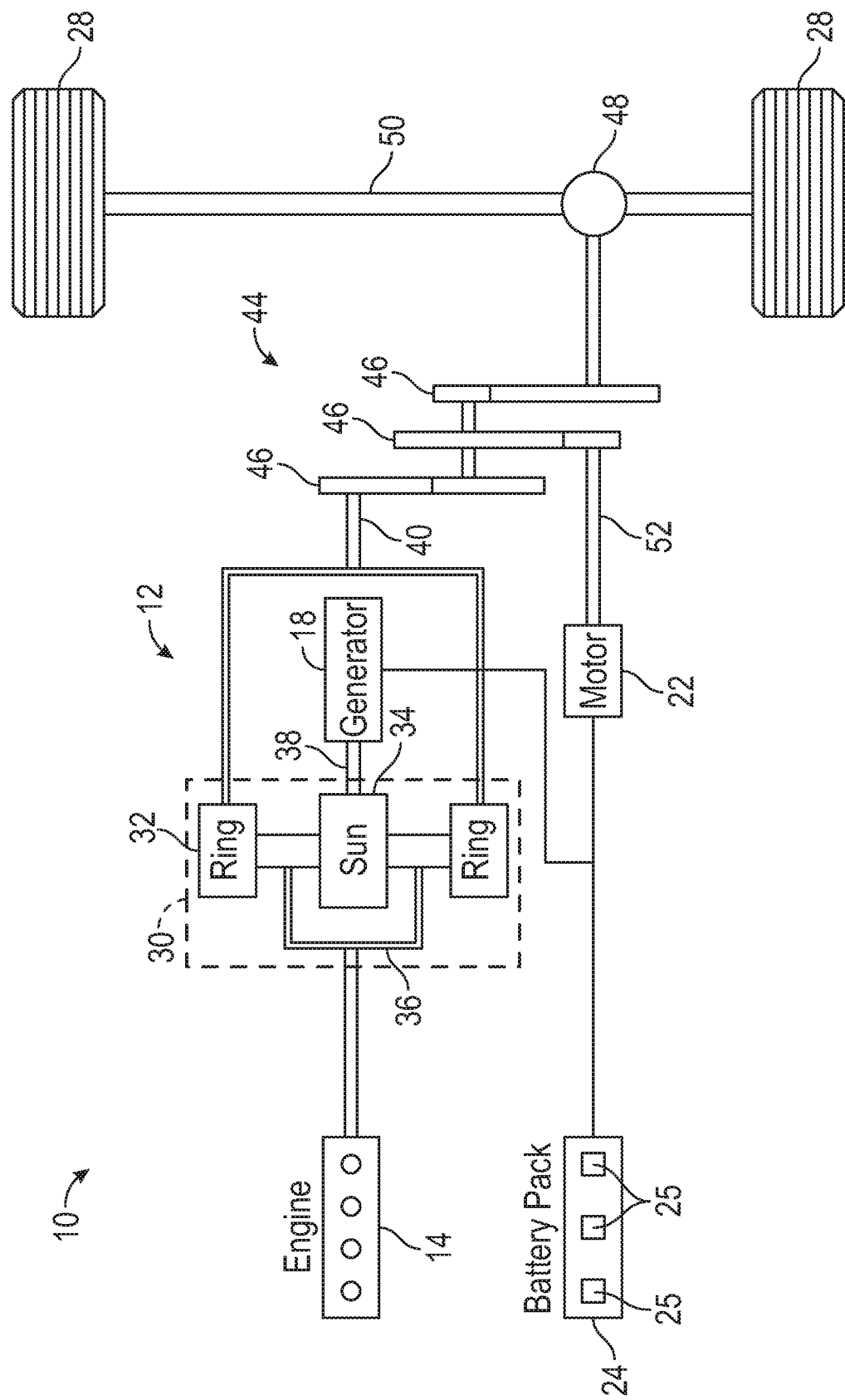
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), start/stop hybridized electric vehicles, and modular hybrid transmission electric vehicles.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
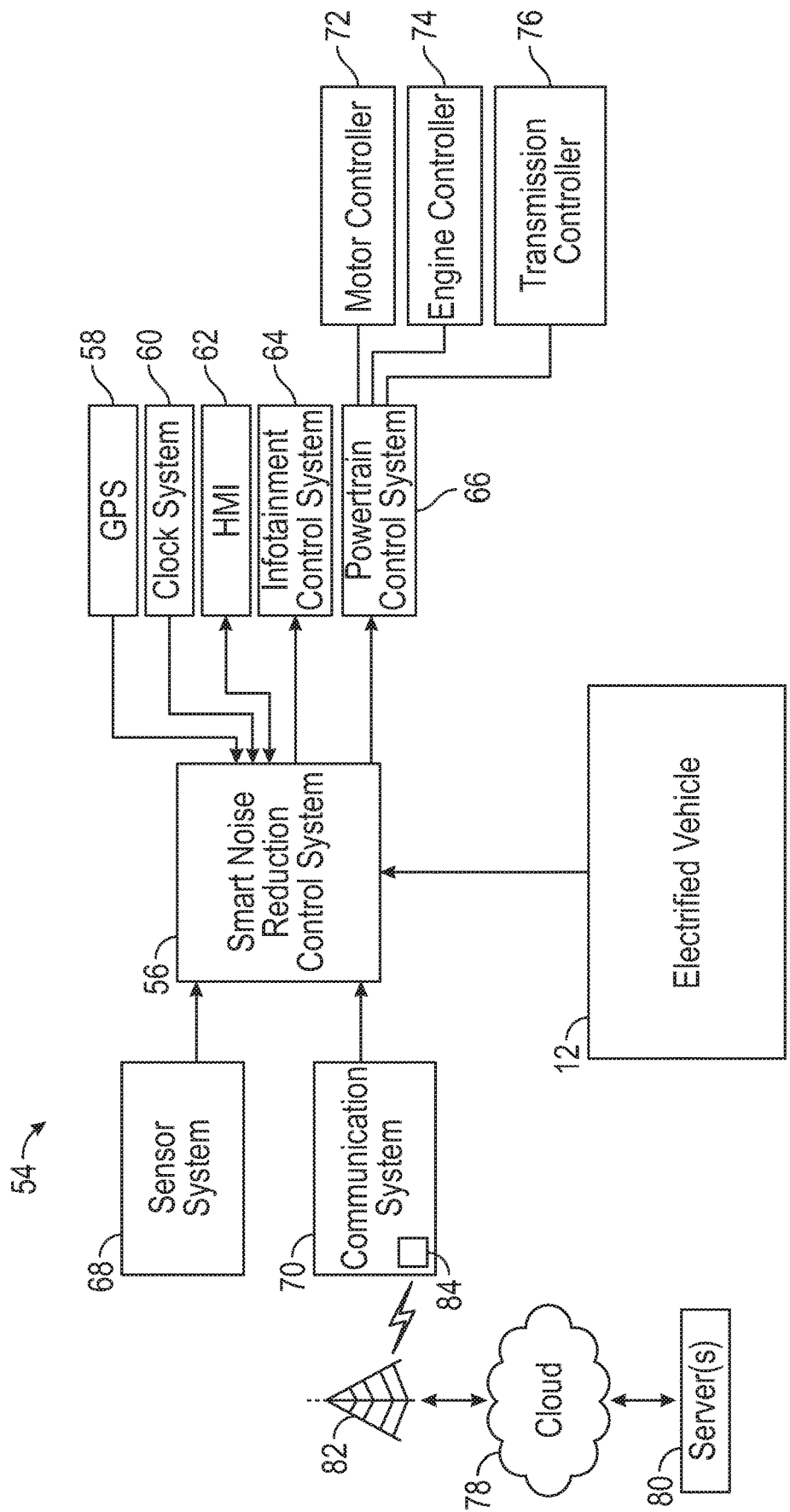
FIG. 2 schematically illustrates a vehicle system of an electrified vehicle.

FIG. 2 is a highly schematic depiction of a vehicle system 54 that may be employed within an electrified vehicle, such as electrified vehicle 12 of FIG. 1. The various components of the vehicle system 54 are shown schematically to better illustrate the features of this disclosure.

The vehicle system 54 may include a smart noise reduction control system 56 (hereinafter "control system") that is adapted to automatically reduce vehicle exterior noise during operation of the electrified vehicle 12 if conditions are favorable for reducing vehicle exterior noise. For example, the control system 56 may intelligently control various other systems of the vehicle system 54 based on a combination of database lookup, user selected options, onboard sensor data, and predetermined parameters by executing a noise reduction mode in which normal vehicle operating mode behaviors of these other system are actively modified in a manner that reduces vehicle exterior noise.

In addition to the control system 56, the vehicle system 54 may include a global positioning system (GPS) 58, a clock system 60, a human machine interface (HMI) 62, an infotainment control system 64, a powertrain control system 66, a sensor system 68, and a communication system 70. Each of these systems is described in greater detail below.

The GPS 58 is configured for communicating current vehicle location information to the control system 56. The GPS 58 could be a part of an on-board navigation system of the electrified vehicle 12 that is capable of communicating drive route information and other information to the control system 56.

The clock system 60 is configured to provide a real-time estimate of the current time to the control system 56. The clock system 60 may include a timer, a clock, etc.

The HMI 62 may be located within a passenger cabin of the electrified vehicle 12 and may include a user interface. A user may interact with the user interface via a touch screen, tactile buttons, audible speech, speech synthesis, etc. The driver can either enter information into the user interface or the user interface can display information to the user. For example, in an embodiment, the control system 56 can communicate with the user by displaying status information on the HMI 62, such as whether or not a noise reduction mode has been activated for reducing vehicle exterior noise.

The infotainment control system 64 can control a volume of the sound (e.g., music, etc.) emitted from any speakers located inside the passenger cabin of the electrified vehicle 12. The speakers may be connected to the GPS 58, the HMI 62, or any other infotainment device of the electrified vehicle 12. Although shown separately in FIG. 2, the GPS 58, the HMI 62, and the infotainment control system 64 could be embodied within a single hardware device.

The powertrain control system 66 may control the operating behaviors of the engine 14, the motor 22, and the transmission driveline of the electrified vehicle 12. In an embodiment, the powertrain control system 66 includes a motor controller 72, an engine controller 74, and a transmission controller 76. The control system 56 may communicate with the powertrain control system 66, including each of the motor controller 72, the engine controller 74, and the transmission controller 76, in order to influence the operating behaviors of the engine 14, the motor 22, and the transmission driveline for reducing exterior noise.

The sensor system 68 is adapted to sense a variety of environmental conditions related to the exterior environment within which the electrified vehicle 12 is operating. The sensor system 68 may include various sensors for making these determinations. For example, the sensor system 68 may include temperature sensors for detecting ambient temperatures and one or more proximity sensors for detecting nearby bystanders (i.e., pedestrians), nearby objects, locations, etc. The proximity sensors may be capacitive, ultrasonic, magnetic, weight, LIDAR, infrared, induction, radar, or any other type of sensors or combination of sensors.

The communication system 70 may be configured to communicate over a cloud 78 (i.e., the internal to obtain various information stored on one or more servers 80. Each server 80 can identify, collect, and store user data associated with the electrified vehicle 12 for validation purposes. Upon an authorized request, data may be subsequently transmitted to the communication system 70, via a cellular tower 82 or some other known communication technique (e.g., Wi-Fi, Bluetooth, etc.). The communication system 70 may include a transceiver 84 for achieving bidirectional communication with the cellular tower 82. For example, the transceiver 84 can receive data from the servers 80 or can communicate data back to the servers 80 via the cellular tower 82. Although not necessarily shown or described in this highly schematic embodiment, numerous other components may enable bidirectional communication between the electrified vehicle 12 and the web-based servers 80.

In an embodiment, the communication system 70 communicates with the servers 80 to obtain driver history information (e.g., location history, mode selection history, driver settings history, etc.), weather information, noise ordinance information, etc. The data received by the communication system 70 from the servers 80 may be communicated to the control system 56 where it is used in combination with other data to determine whether or not to activate the noise reduction mode.

The control system 56 may be part of an overall vehicle control system or could be a separate control system that communicates with the vehicle control system. The control system 56 may include one or more control modules equipped with executable instructions for interfacing with and commanding operation of various components of the vehicle system 54. Each control module of the control system 56 may include a processing unit and non-transitory memory for executing the various control strategies and modes of the vehicle system 54.

Figure 3:
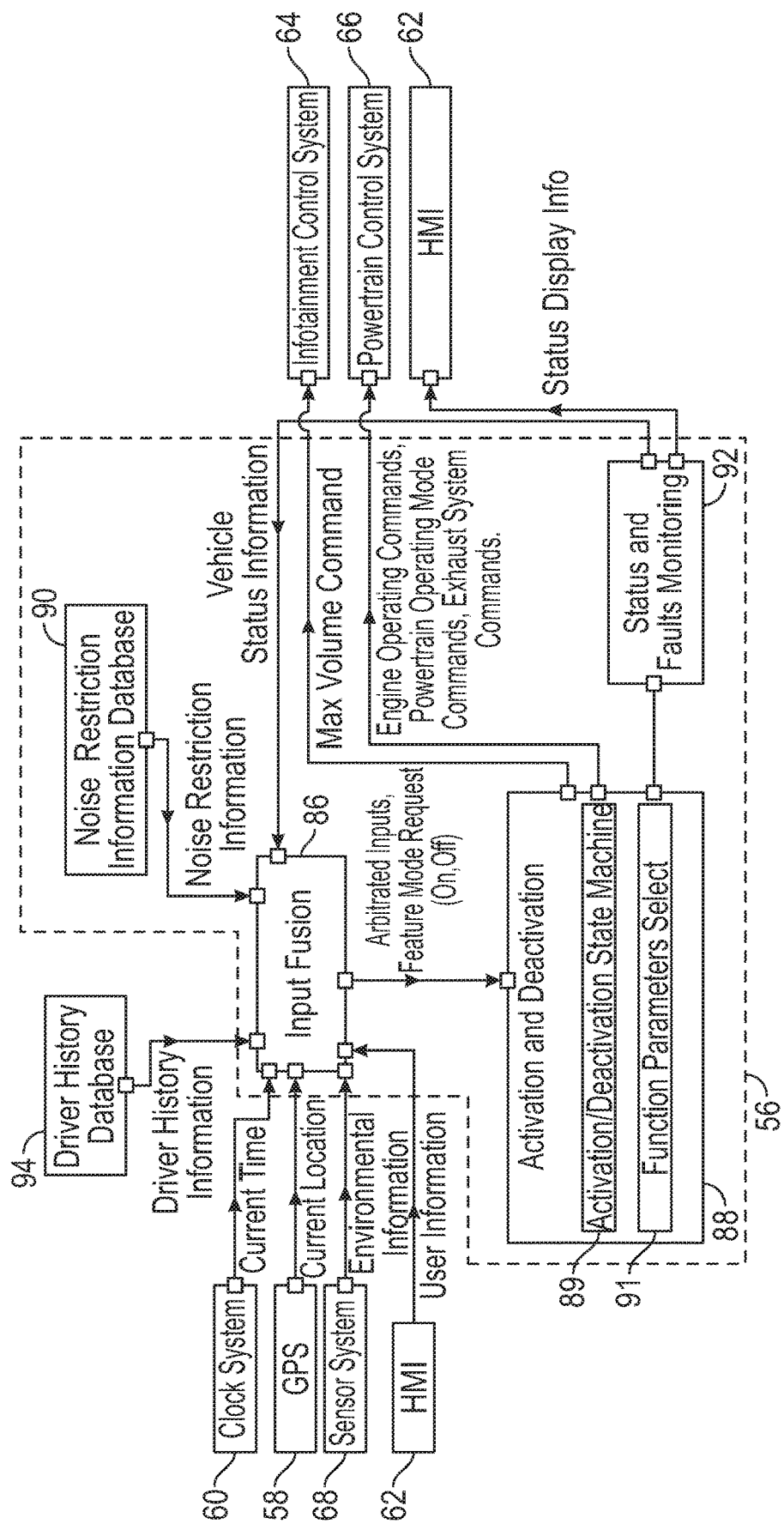
FIG. 3 is a block diagram illustrating a smart noise reduction control system of the vehicle system of FIG. 2.

Referring now primarily to FIG. 3, the smart noise reduction control system 56 may include an input fusion block 86, an activation/deactivation block 88, a noise restriction database 90, and a status and faults monitoring block 92. These blocks each performs specific actions for determining whether or not to activate the noise reduction mode of the electrified vehicle 12.

The input fusion block 86 of the control system 56 determines the primary data to use for activation/deactivation of the noise reduction mode. The input fusion block 86 may receive and process various inputs for making this determination.

A first input to the input fusion block 86 may include noise restriction information from the noise restriction database 90. The noise restriction information may include various times, locations, and acceptable noise levels associated with each specific time and location. The noise restriction information may additionally include local noise ordinance information. The input fusion block 86 can utilize the noise restriction information to determine whether or not the noise reduction mode should be activated, and to determine the final mode requests. The communication system 70 of the vehicle system 54 may optionally communicate with one of the servers 80 over the cloud 78 for updating and storing the noise restriction information within the noise restriction database 90.

A second input to the input fusion block 86 may include driver history information from a driver history database 94. In an embodiment, the communication system 70 of the vehicle system 54 communicates with the driver history database 94 over the cloud 78. The driver history information may include location history (i.e., locations where the electrified vehicle 12 has previously traveled), mode selection history (i.e., what vehicle modes were utilized at each previous location), driver settings history (i.e., what driver settings were utilized at each previous location), etc.

A third input to the input fusion block 86 may include the current time from the clock system 60. A fourth input to the input fusion block 86 may include a current location of the electrified vehicle 12 from the GPS 58.

A fifth input to the input fusion block 86 may include environmental information from the sensor system 68. The environmental information may include ambient temperatures, the presence of nearby pedestrians or objects, etc.

A sixth input to the input fusion block 86 may include user information from the HMI 62. The user information may include specific vehicle settings selected by the user (e.g., volume settings, exhaust valve settings, EV now, powertrain mode settings (e.g., track/sport/normal, etc.), vehicle specific feature settings ('quiet' Engine Idle Mode Settings, etc.), etc.

A seventh input to the input fusion block 86 may include vehicle status information from the status and faults monitoring block 92. The vehicle status information may include vehicle health information, vehicle fault information, etc. Relying on these various inputs, the input fusion block 86 determines whether or not the noise reduction mode should be activated, and determines the final mode requests.

The activation/deactivation block 88 uses the arbitrated data from the input fusion block 86 to determine if the noise reduction mode should be enabled, disabled, activated, or deactivated. The activation/deactivation block 88 may also determine which predetermined parameter set should be used to create feature outputs.

The activation/deactivation block 88 may include an activation/deactivation state machine block 89 and a function parameters select block 91. The activation/deactivation state machine block 89 may be a state machine including three states: Fault, Active, and Off. In an embodiment, the initial state of the activation/deactivation state machine block 89 is Off. The state may transition to Active when the activation/deactivation state machine block 89 receives a 'Feature Mode Request=On' signal from the input fusion block 86, or the state may transition to Fault when a fault is detected by the status and faults monitoring block 92. The function parameters select block 91 may execute either in parallel with the activation/deactivation state machine block 89 or only when it is in the Active state. The function parameters select block 91 may receive the arbitrated inputs from the input fusion block 86, and based on these arbitrated inputs, may determine what output parameters to send to the features it is controlling (for example, the new volume command, engine operating mode commands, powertrain operating mode, etc.).

If the noise reduction mode is activated, the activation/deactivation block 88 may send command signals to each of the infotainment control system 64, the powertrain control system 66, and the HMI 62. For example, the activation/deactivation block 88 may command the infotainment control system 56 to modify speaker volume, may command the powertrain control system 66 to modify engine, powertrain, or exhaust operating behaviors, and may command the HMI 62 to display a noise reduction status state.

The status and faults monitoring block 92 monitors the behaviors of the vehicle system 54 to determine whether the noise reduction mode is functioning properly. The status and faults monitoring block 92 may provide vehicle status information to the input fusion block 86. The status and faults monitoring block 92 may also communicate with the HMI 62 for displaying noise reduction mode status states to the user. Exemplary noise reduction mode status states that may be displayed on the HMI 62 include:

Enabled: The noise reduction mode is currently able to be activated or deactivated by the user or system strategy (i.e., the vehicle's health and state can support the feature's operation);

Disabled: The noise reduction mode is deactivated and cannot currently be activated by the system strategy (i.e., the vehicle's health or state cannot support the feature's operation);

Activated: The noise reduction mode is currently operating to reduce exterior vehicle noise;

Deactivated: The noise reduction mode is not currently operating to reduce exterior vehicle noise but may be activated by the user or system strategy; and Faulted: The noise reduction mode is in a faulted state and is not operating normally.

The control system 56 may command changes to various normal vehicle operating mode behaviors if it is determined that the noise reduction mode should be activated, or if the user manually requests its activation. In an embodiment, the control system 56 commands the infotainment control system 64 to reduce or mute speaker volume to achieve lower vehicle exterior noise. In another embodiment, the control system 56 commands the engine controller 74 to perform a 'quiet start' by modifying the speed and torque targets of the engine 14 to achieve lower vehicle exterior noise. In another embodiment, the control system 56 commands the engine controller 74 to request changes in idle speed and torque of the engine 14 to minimize vehicle exterior noise. In another embodiment, the control system 56 commands the engine controller 74 to inactivate a portion of the cylinders of the engine 14 to minimize vehicle exterior noise. In yet another embodiment, the control system 56 commands the engine controller 74 and the motor controller 72 to request an electric operating mode in which engine 14 starting is restricted during driving in order to reduce vehicle exterior noise. In yet another embodiment, the control system 56 commands the transmission controller to request a quiet operating mode of the exhaust bypass valves to reduce vehicle exterior noise.

Any combination of the above operating behaviors may be requested during the noise reduction mode. In addition, other vehicle operating mode behaviors may be altered during the noise reduction mode within the scope of this disclosure.

Figure 4:
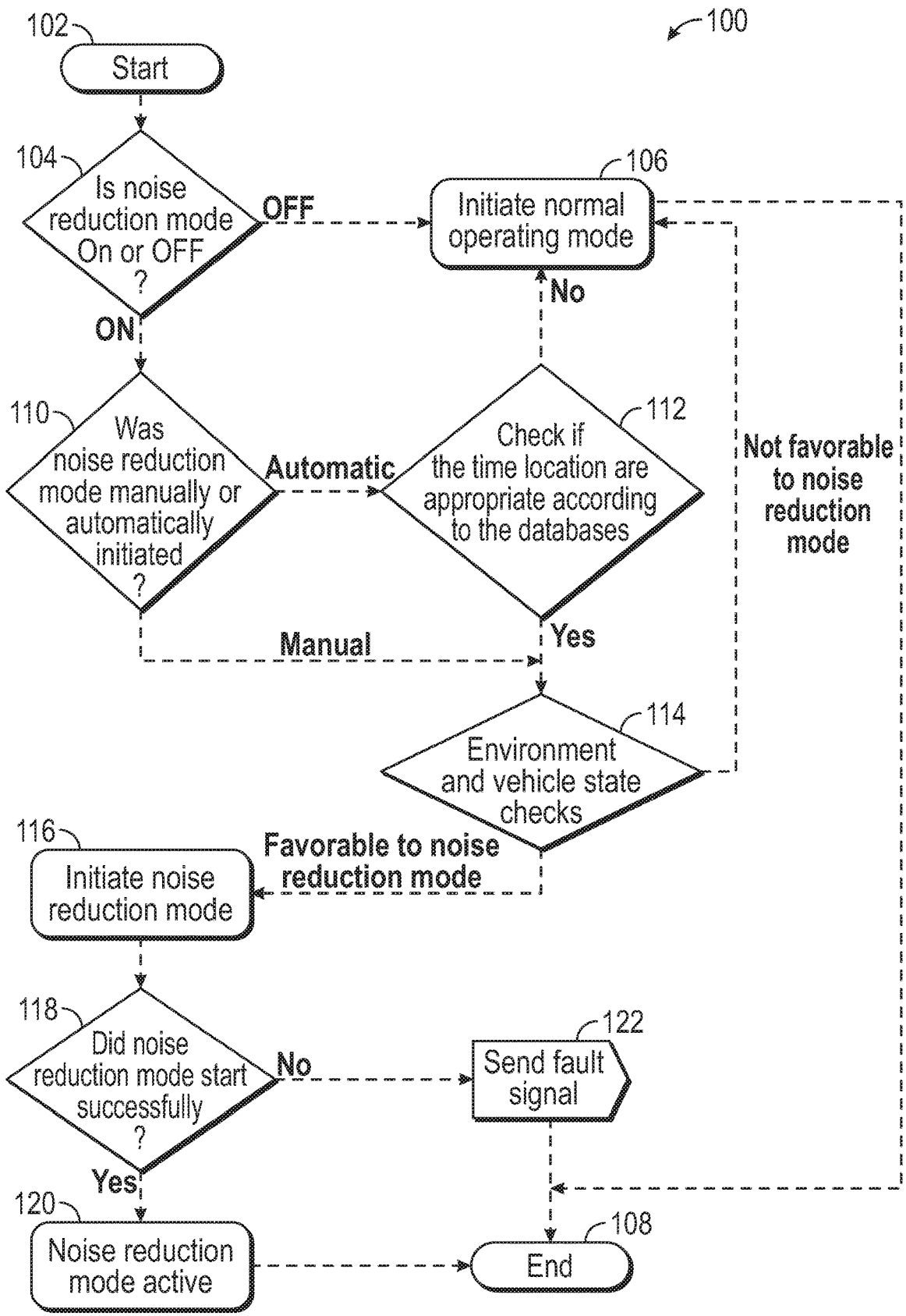
FIG. 4 schematically illustrates an exemplary method for determining whether to activate a noise reduction mode of an electrified vehicle.

FIG. 4, with continued reference to FIGS. 1-3, illustrates an exemplary method 100 for determining whether to invoke the noise reduction mode of the electrified vehicle 12. In an embodiment, the control system 56 is programmed with one or more algorithms adapted to execute the exemplary method 100.

The method 100 begins at block 102. At block 104, the control system 56 determines whether the noise reduction mode of the electrified vehicle 12 is currently ON or OFF. For example, the control system 56 may periodically analyze signals received from the activation/deactivation block 88 to determine whether the noise reduction mode is currently ON or OFF.

If the noise reduction mode is OFF at block 104, the method 100 proceeds to block 106 by operating the electrified vehicle 12 in a normal operating mode. The method 100 may then end at block 108.

Alternatively, if the noise reduction mode is ON at block 104, the method 100 may proceed to block 110 by determining whether the noise reduction mode was automatically or manually initiated. If automatically initiated, the method 100 then proceeds to block 112. The control system 56 determines whether the current time and current location of the electrified vehicle 12 are appropriate for activating the noise reduction mode at block 112. In an embodiment, this determination includes analyzing noise restriction information from the noise restriction database 90 and driver history information from the driver history database 94.

The method 100 returns to block 106 and a normal operating mode of the electrified vehicle 12 is initiated if it is determined that the conditions are not appropriate for the noise reduction mode at block 112. If, however, the conditions are determined to be appropriate for the noise reduction mode at block 112, the method 100 may proceed to block 114. The method 100 may also proceed directly to block 114 from block 110 if the noise reduction mode is found to be manually initiated at block 110.

At block 114, the control system 56 reviews the current environmental conditions and performs a vehicle status check. In an embodiment, the control system 56 analyzes feedback from the sensor system 68 when reviewing the environmental conditions and analyzes feedback from the status and faults monitoring block 92 when performing the vehicle status check.

The method 100 returns to block 106 and a normal operating mode of the electrified vehicle 12 is initiated if it is determined that the conditions are not appropriate for the noise reduction mode at block 114. If, however, the conditions are determined to be appropriate for the noise reduction mode at block 114, the method 100 may proceed to block 116 by initiating the noise reduction mode.

At block 118, the control system 56 determines whether the noise reduction mode started successfully. If a YES flag is returned, the noise reduction mode is considered active at block 120. If a NO flag is returned, the method 100 proceeds to block 122. At block 122, the status and faults monitoring block 92 may communicate a fault signal to the input fusion block 86. The method 100 then ends at block 108.

The vehicle systems and methods of this disclosure provide intelligent noise reduction strategies for electrified vehicles by interfacing with multiple subsystems to provide more robust decision-making and capabilities for noise reduction. The "smart" noise reduction methods of this disclosure do not rely exclusively on user selection of the noise reduction mode and thus allow for automatic noise reduction modes that utilize a combination of database lookup, user selected options, onboard sensor data, and predetermined parameters to request changes to normal vehicle operating mode behaviors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   automatically operating an electrified vehicle in a noise reduction mode, via a control system of the electrified vehicle, when, based at least on noise restriction information and driver history information received by the control system, a current time and a current location of the electrified vehicle are appropriate for invoking the noise reduction mode,
   wherein the driver history information is obtained from a driver history database.

2. The method as recited in claim 1, wherein automatically operating the electrified vehicle in the noise reduction mode includes reducing or muting a speaker volume of an infotainment control system.

3. The method as recited in claim 1, wherein automatically operating the electrified vehicle in the noise reduction mode includes modifying a speed target and a torque target of an engine of the electrified vehicle.

4. The method as recited in claim 1, wherein automatically operating the electrified vehicle in the noise reduction mode includes modifying an idle speed and a torque target of an engine of the electrified vehicle.

5. The method as recited in claim 1, wherein automatically operating the electrified vehicle in the noise reduction mode includes inactivating at least one cylinder of an engine of the electrified vehicle.

6. The method as recited in claim 1, wherein automatically operating the electrified vehicle in the noise reduction mode includes requesting an electric operating mode in which starting of an engine of the electrified vehicle is restricted during the noise reduction mode.

7. The method as recited in claim 1, wherein automatically operating the electrified vehicle in the noise reduction mode includes modifying an operating mode of an exhaust bypass valve.

8. The method as recited in claim 1, comprising obtaining the noise restriction information from a noise restriction database.

9. The method as recited in claim 8, wherein the noise restriction information includes acceptable noise levels associated with the current time and the current location, and local noise ordinance information.

10. The method as recited in claim 1, wherein the driver history information includes locations where the electrified vehicle has previously traveled, vehicle modes that were utilized at each of the locations where the electrified vehicle has previously travelled, and driver settings that were utilized at each of the locations where the electrified vehicle has previously travelled.

11. The method as recited in claim 1, wherein automatically operating the electrified vehicle in the noise reduction mode is further based on environmental information.

12. A method, comprising:
automatically operating an electrified vehicle in a noise reduction mode, via a control system of the electrified vehicle, when, based at least on noise restriction information and driver history information received by the control system, a current time and a current location of the electrified vehicle are appropriate for invoking the noise reduction mode,
wherein automatically operating the electrified vehicle in the noise reduction mode is further based on environmental information,
wherein the environmental information includes ambient temperatures or a presence of nearby pedestrians or objects.

13. The method as recited in claim 1, wherein automatically operating the electrified vehicle in the noise reduction mode is further based on vehicle status information.

14. The method as recited in claim 13, wherein the vehicle status information includes vehicle health information and vehicle fault information.

15. An electrified vehicle, comprising:
a drive wheel;
an engine;
an electric machine, wherein both the engine and the electric machine are adapted to selectively supply torque for powering the drive wheel; and
a smart noise reduction control system configured to control the electrified vehicle in a noise reduction mode based at least on a current time, a current location, noise restriction information, and driver history information, wherein the driver history information is obtained from a driver history database.

16. An electrified vehicle, comprising:
a drive wheel;
an engine;
an electric machine, wherein both the engine and the electric machine are adapted to selectively supply torque for powering the drive wheel; and
a smart noise reduction control system configured to control the electrified vehicle in a noise reduction mode based at least on a current time, a current location, noise restriction information, and driver history information,
wherein the smart noise reduction control system includes an input fusion block, an activation/deactivation block, a noise restriction database, and a status and faults monitoring block.

17. The vehicle system as recited in claim 15, wherein the smart noise reduction control system is configured to command an infotainment control system to reduce or mute a speaker volume in response to invoking the noise reduction mode.

18. The vehicle system as recited in claim 15, wherein the smart noise reduction control system is configured to command a modification of an operating behavior of the engine in response to invoking the noise reduction mode.

19. The vehicle system as recited in claim 15, wherein the smart noise reduction control system is configured to command a modification of an operating behavior of an exhaust component of the electrified vehicle in response to invoking the noise reduction mode.

* * * * *